US012606144B2

(12) United States Patent
Abbott

(10) Patent No.: US 12,606,144 B2
(45) Date of Patent: Apr. 21, 2026

(54) UNION SCREW FOR A PIPELINE PROVIDED WITH AT LEAST ONE FLANGE, IN PARTICULAR A BRAKE PIPE

(71) Applicant: COOPER-STANDARD AUTOMOTIVE (DEUTSCHLAND) GMBH, Schelklingen (DE)

(72) Inventor: Sebastian Abbott, Heidelberg (DE)

(73) Assignee: Cooper-Standard Automotive (Deutschland) GmbH, Schelklingen (DE)

( * ) Notice: Subject to any disclaimer, the term of this patent is extended or adjusted under 35 U.S.C. 154(b) by 925 days.

(21) Appl. No.: 17/789,434

(22) PCT Filed: Dec. 23, 2020

(86) PCT No.: PCT/EP2020/087797
§ 371 (c)(1),
(2) Date: Feb. 8, 2023

(87) PCT Pub. No.: WO2021/130330
PCT Pub. Date: Jul. 1, 2021

(65) Prior Publication Data
US 2023/0166708 A1 Jun. 1, 2023

(30) Foreign Application Priority Data
Dec. 27, 2019 (DE) ..................... 10 2019 135 827.2

(51) Int. Cl.
*B60T 17/04* (2006.01)
*B05D 5/08* (2006.01)
(Continued)

(52) U.S. Cl.
CPC ............ *B60T 17/043* (2013.01); *B05D 5/086* (2013.01); *C09D 5/084* (2013.01); *C09D 7/70* (2018.01);
(Continued)

(58) Field of Classification Search
CPC .. F16L 19/0283; F16L 19/0286; F16L 58/184
See application file for complete search history.

(56) References Cited

U.S. PATENT DOCUMENTS 7,740,947 B2 6/2010 Maze et al.
2012/0183791 A1 7/2012 Reusmann et al.
(Continued)

FOREIGN PATENT DOCUMENTS

DE 42 36 323 A1 5/1994
DE 295 10 705 U1 11/1995
(Continued)

OTHER PUBLICATIONS

CELO Screw Technology, ZN—Al Flake Coating, Sep. 22, 2020 (Year: 2020).*
(Continued)

*Primary Examiner* — Zachary T Dragicevich
(74) *Attorney, Agent, or Firm* — Lippes Mathias LLP

(57) ABSTRACT

A union screw (1) for pipes (2) provided with at least one flare (21) comprises a metal base body (10) which accommodates the pipe (20). The union screw (1) further comprises a screw head (12), a threaded portion (13), a contact portion (15) which is configured to abut the flare (21) of the pipe (20), and a functional layer (40) with which the base body (10) is coated at least in the region of the threaded portion (13) and the contact portion (15). The functional layer (40) is multi-layered and consists of at least one base coat (41) and a top coat (42) applied to the base coat (41) at least in some areas. The base coat (41) forms a structure for creating corrosion protection and a far-reaching invariance with regard to the material of the usual friction partners of the union screw (1) which, in addition to a binder, also
(Continued)

contains zinc in the form of zinc-containing lamellae (43), which are oriented to lie substantially flat on the base body (10).

24 Claims, 4 Drawing Sheets

(51) Int. Cl.

| | | |
|---|---|---|
| *C09D 5/08* | (2006.01) | |
| *C09D 7/40* | (2018.01) | |
| *C09D 183/12* | (2006.01) | |
| *F16L 19/028* | (2006.01) | |
| *F16L 58/18* | (2006.01) | |

(52) U.S. Cl.

CPC .......... *C09D 183/12* (2013.01); *F16L 19/028* (2013.01); *F16L 58/184* (2013.01)

(56) References Cited

U.S. PATENT DOCUMENTS

| 2014/0106155 | A1 | | 4/2014 | Iandoli Espinosa | |
|---|---|---|---|---|---|
| 2016/0201841 | A1 | * | 7/2016 | Heutchy | F16L 58/184 |
| 2017/0101716 | A1 | | 4/2017 | Roth et al. | |
| 2020/0208763 | A1 | * | 7/2020 | Stahn | F16L 19/028 |
| 2020/0271251 | A1 | * | 8/2020 | Gunji | F16L 19/0286 |
| 2022/0348181 | A1 | * | 11/2022 | Gunji | F16L 19/0286 |
| 2022/0381379 | A1 | * | 12/2022 | Seino | F16L 19/0286 |

FOREIGN PATENT DOCUMENTS

| DE | 202 14 365 | U1 | 1/2003 | | |
|---|---|---|---|---|---|
| DE | 10161 713 | A1 | 7/2003 | | |
| DE | 10 2007044682 | A1 | 1/2009 | | |
| DE | 10 2012 108 433 | B3 | 1/2014 | | |
| DE | 20 2014 102 663 | U1 | 7/2014 | | |
| DE | 1020 13011213 | B3 | 10/2014 | | |
| DE | 2020 17104112 | U1 | 9/2017 | | |
| EP | 2 136 119 | A1 | 12/2009 | | |
| EP | 2 957 796 | A1 | 12/2015 | | |
| EP | 3153552 | A1 | 4/2017 | | |
| EP | 3 129 691 | B1 | 9/2018 | | |
| EP | 3 347 638 | B1 | 12/2018 | | |
| EP | 3 555 512 | A1 | 10/2020 | | |
| WO | 2005090502 | A1 | 9/2005 | | |
| WO | 2006007985 | A1 | 1/2006 | | |
| WO | 2011012434 | A1 | 2/2011 | | |
| WO | 2017194587 | A1 | 11/2017 | | |
| WO | WO-2017216221 | A1 | * | 12/2017 | F16L 19/0283 |
| WO | WO 2019/025587 | A1 | 2/2019 | | |

OTHER PUBLICATIONS

PCT/EP2020/087797, International Search Report (with English translation) and Written Opinion, Apr. 16, 2021.

Wikipedia—Zinklamellenuberzug (Zinc lainella coating), Retrieved from "https://de.wikipedia.org/w/index.php?title=Zinklamellenüberzug &oldid=190094284", dated Jul. 3, 2019 (English Machine Translation Included).

Wikipedia—Zinc Flake Coating, Retrieved from "https://en.wikipedia.org/w/index.php?title=Zinc_flake_coating&oldid=921419542", dated Oct. 15, 2019.

Lehrbuch Oberflachentechnik (Textbook Surface Technology), pp. 164-171, (c) 1996 (English Machine Translation Included).

Galfan Superior Corrosion Protection 5% aluminum, 95% zinc, pp. 1-12, dated 2013.

Zinklamellenbeschichtung: Korrosionsschutz für den Spezialfall aus Konstruktionspraxis (Zinc flake protection: corrosion protection for the special case), Aug. 7, 2018, (English Machine Translation Included).

Wikipedia, Feuerverzinken (Hot-dip galvanizing), Retrieved from "https://de.wikipedia.org/w/index.php?title=Feuerverzinken&oldid= 193745847", dated Nov. 4, 2019 (English Machine Translation Included).

Din En 13858:2003-11, (16 pages), dated Feb. 2007, (English Machine Translation Included).

English language translation of Decision on Revocation of European Patent No. EP 3884193 based upon EO Application No. 20839325.6 corresponding to the present application, dated Jun. 20, 2025.

* cited by examiner

Test Result of Torque to Axial Load Typical ZnNi Coating with
Lubricant at 15 Nm

Test Result of Torque to Axial Load Zn-Lamellae based Coating System at 15 Nm Tightening Torque

Test Result of Torque to Pipe Torque Zn-Lamellae based Coating System at 15 Nm Tightening Torque

(resistance)

(fitting pilot)

(slip)

UNION SCREW FOR A PIPELINE PROVIDED WITH AT LEAST ONE FLANGE, IN PARTICULAR A BRAKE PIPE

The invention relates to a union screw for pipelines provided with at least one flare, in particular brake pipes.

The union screw comprises a metal base body that extends in an axial direction and has a passage opening designed to accommodate the pipeline. A screw head formed on the base body is designed to transmit a torque to the union screw. A threaded portion formed on the base body has an external thread and is designed to screw the union screw into a threaded hole. A contact portion formed on the base body is designed to lie on the flare of the pipeline. The metal base body is coated with a functional layer that protects against corrosion in particular.

Such a union screw is described in the standard DIN 74 233, Part 1 concerning brake tube fittings and is usually used for brake tubes provided with a flare in accordance with the standard DIN 74 234. The brake tubes typically have a flare at each end.

Brake pipes, also called brake lines, or fuel pipes, also called fuel lines, which are used in motor vehicles and can be rigid or flexible, usually have a multi-layer structure. An inner tube, which is usually made of aluminum or steel, is surrounded by a corrosion protection layer that is coated with a protective layer, which is generally made of plastic or is formed as a lacquer layer, to protect against external influences.

For the connection of such a pipeline, for example to an aggregate of the braking system of a motor vehicle, such as a brake cylinder or a brake booster, so-called union screws or pipe screws are used, which have a through opening for holding the pipeline and an external thread for screwing into an opening of the unit provided with an internal thread, the so-called tapped hole. Such a threaded hole is described, for example, in the standard DIN 74 235 concerning tapped holes.

The pipe is inserted into the through opening in such a way that the flare arranged at the end of the pipe is pressed against a connection face located at the bottom of the opening when screwing the union screw into the opening of the unit and thus held in the opening between the connection face and a contact face arranged at the contact portion of the union screw.

Union screws for fastening pipes are described, for example, in DE 10 2012 108 433 B3, DE 42 36 323 A1, EP 2 136 119 A1 and DE 20 2014 102 663 U1.

The union screw known from DE 10 2012 108 433 B3 is characterized by the fact that two layers of a friction-reducing layer, which is a dry sliding film based on polyethylene, is applied to the contact surface. In this way, the pipe screw generates a comparatively low coefficient of friction in the area of the contact surface, which ensures that torsion of the pipeline is avoided when contacting the flare of the pipe and the friction that occurs with it. Because a torsion that occurs led to an unwanted torsional stress in the pipe, which causes the risk of loosening the union screw. A low coefficient of friction in the area of the contact surface is also generated by a double coating in the pipe screw known from DE 20 2014 102 663 U1.

The flare of the pipe is usually made by forming. The front face of the flare in the axial direction of the pipe acts as a sealing face and must therefore be as smooth as possible and free of cracks and grooves. Therefore, it is necessary to remove the protective layer in an end section of the pipe before forming. This decoating is usually carried out either by means of mechanical processing, in which by a peeling tool, as it is known, for example, from DE 202 14 365 U1, or by a changing pressurization generating roller tool, as it is known from DE 10 2013 011 213 B3, the protective layer in the area of the end section is replaced, or by means of laser processing, as it is known from DE 295 10 705 U1, in which the protective layer is removed by means of a laser beam.

In order to keep the friction between the flare of the pipe and the contact portion of the union screw as low as possible, it is known from EP 3 129 691 B1 and EP 3 347 638 B1 to remove the protective layer in the end section of the pipeline only partially, in such a way that a remnant of the protective layer remaining on the surface of the flange facing the contact portion ensures comparatively low friction.

The friction occurring between the threaded hole and the threaded portion of the union screw, on the other hand, should be as high as possible in order to ensure a firm and permanent fit of the union screw in the threaded hole. However, the units that have the threaded hole can be made of different materials, usually aluminum or steel. Coatings of the union screw in the region of the threaded portion, as they are known, for example, from EP 2 957 796 A1, have the disadvantage that the coefficient of friction varies greatly depending on the material of which the so-called friction partner, such as the internal thread of the threaded hole, is composed. This has proven to be undesirable in practice, as a defined, as equal as possible tightening torque is usually required for the union screw.

Furthermore, a mounting nut is known from DE 10 2007 044 682 A1, which is provided with a nut body and a threaded hole. The nut body has a contact surface surrounding the threaded hole for a ring that serves as a loss lock. The contact surface is surrounded by a circumferential flare collar. The mounting nut is provided with a zinc lamella coating, which serves as corrosion protection.

A chisel holder change system having a base part with a chisel holder mounting in which a chisel holder equipped with a chisel can be used describes DE 101 61 713 A1. The chisel holder is inserted into the chisel holder mounting with a holder shaft and held in it by means of clamping screws. The clamping screws can be screwed into a thread holder of the base part and are supported under tension in a clamping holder of the holder shaft. The surfaces of the external thread of the clamping screw and the internal thread of the thread holder are provided with a metallic layer of zinc and aluminum fins and a mineral chromium oxide binder, which are baked in after application.

The invention is based on the object of creating a union screw and a method of manufacturing a union screw by which a tightening torque can be generated that is as invariant as possible with respect to the material of the friction partner of the union screw.

This object is achieved by a union screw according to claim 1, the use of the union screw according to claim 11 and the method of manufacturing the union screw according to claim 12. Preferred embodiments of the invention are defined in claims 2 to 10 and 13 to 17.

The union screw according to the invention for pipes provided with a flare, in particular brake pipes, comprises a metal base body which extends in an axial direction and has a through opening which has a diameter in a radial direction and is configured to accommodate the pipe. The union screw further comprises a screw head formed on the base body, which is configured to transmit a torque to the union screw. The union screw also comprises a threaded portion formed on the base body, which has an external thread and is configured to screw the union screw into a tapped hole, and a contact portion formed on the base body, which is configured to abut the flare of the pipe.

The union screw has a functional layer with which the base body is coated at least in the area of the threaded portion and the contact section. The functional layer according to the invention is multi-layered and is composed at least of a base coat and a top coat applied to the base coat at least partially. The top coat contains a lubricant to create a friction-reducing coating. The base coat contains a binder and zinc to create corrosion protection.

In order to achieve, in addition to reliable corrosion protection, a far-reaching invariance with regard to the usual friction partners of the union screw, i.e. about a counter-thread made of in particular aluminum or steel, in which the union screw intervenes in the mounted state, the base coat according to the invention forms a structure in which the zinc is present in the form of zinc-containing lamellae. The zinc-containing lamellae, i.e. zinc lamellae, are substantially aligned flat or flat on the base body in order to create an effective connection with the base body.

A substantially flat or flat alignment of the zinc lamellae within the meaning of the present invention is understood to mean an arrangement in which the zinc lamellae are predominantly parallel to the base coat. This means that each individual zinc lamella or zinc flake does not have to be parallel to the base coat, nor does every single zinc lamella or zinc flake have to be flat.

Such a union screw is used according to the invention for a pipe provided with a flare, in particular a brake pipe or tube.

The method according to the invention for manufacturing such a union screw is characterized by the following process steps. The base body is first coated with a first composition containing zinc-containing lamellae and a binder to create the base coat. Subsequently, the base body is coated in at least one part of the base coat with a second composition containing a lubricant to create the top coat.

The invention is based on the knowledge that zinc-containing, in particular platelet-shaped particles in the form of lamellae, which are usually five to ten times as long as high and wide, not only have a better solubility compared to spherical, that is, powdered, particles, but due to their anisotropy can substantially align flat on the metal surface of the base body and thus create an effective compound with the base body. On the one hand, this ensures reliable corrosion protection and, on the other hand, causes a coefficient of friction on the surface of the union screw, especially in the area of the threaded portion, which is largely invariant with regard to the usual friction partners of the union screw, such as an internal thread in which the external thread of the threaded portion intervenes, or the material from which these friction partners are made, in particular steel or aluminum or alloys thereof.

It has been found that a reduction of the so-called pipe torque or pipe moment is a function of the evenness or flatness of the zinc lamellae and their parallelism to the base coat. During the tightening of the union screw, the shear stresses in the base coat caused by the turning of the screw connection are not resisted to the same extent as the vertical forces that arise in the connection. In other words, it opens up the possibility of "sliding" between the lamellae or slats in the direction in which the slats lie, which significantly reduces the pipe torque.

The zinc-containing lamellae are advantageously platelet-shaped and therefore have a length, a width and a thickness. Preferably, the length and/or the width and/or the thickness are between 5 microns and 500 microns, preferably between 10 microns and 200 microns, and more preferably between 50 microns and 150 microns. The extension of the lamellae in the surface, i.e. along the length and width, has proven to be an effective connection with the base body and an effective reduction of the pipe torque. Depending on the application, the thickness of the lamellae can therefore be quite lower than their length and width and preferably also move in ranges between 10 nm and 900 nm, more preferably between 50 nm and 500 nm.

Zinc is the essential component of the lamellae. In a preferred embodiment of the union screw according to the invention, the zinc-containing lamellae contain more than 50 wt. % zinc. Preferably, the zinc-containing lamellae also contain lamellae of another metal, which is preferably selected from a group comprising aluminum, tin, magnesium, nickel, cobalt or manganese. In a particular embodiment, the base coat comprises a mixture of zinc and aluminum lamellae.

It has proven to be advantageous if the zinc is alloyed with another metal. The further metal is preferably selected from a group comprising aluminum, tin, magnesium, nickel, cobalt or manganese. If lamellae made of a metal alloy are used, a zinc-aluminum alloy is preferred. These metal components of the base coat are connected by a matrix of the binder.

In a further preferred embodiment of the union screw according to the invention, the binder contains a silane. The silane conveniently has functional groups to enable a good bonding of the metal components. A preferred reactive and functional chemical unit is the epoxy group. A particularly suitable representative of such an epoxysilane is γ-glycidoxypropyltrimethoxysilane.

Preferably, the lubricant contains a hydrofluorocarbon, preferably a perfluorinated hydrocarbon, more preferably polytetrafluoroethylene.

The base body is advantageously also coated with the functional layer in the area of the screw head. In order to ensure full-surface corrosion protection, the entire surface of the base body is preferably coated with the functional layer.

Preferably, the top coat is applied to the entire base coat. As a rule, however, it is sufficient if the top coat is only present on the base coat in some areas. Experiments have shown that a sufficient coefficient of friction is achieved even if the top coat is spread stained on the base coat.

In a preferred embodiment of the union screw according to the invention, the base coat forms the lowest layer of the functional layer, that is, the base coat is approximately in the area of the threaded portion the innermost position in the radial direction.

In a further preferred embodiment of the union screw according to the invention, the top coat forms the uppermost coat of the functional layer, that is, the top coat is approximately in the area of the threaded portion the outermost position in the radial direction.

Advantageously, the base coat has, at least in the area of the threaded portion and/or in the area of the contact portion, a layer thickness which is between 0.5 microns and 30.0 microns, preferably between 1.0 microns and 20.0 microns, more preferably between 5.0 microns and 10.0 microns.

The top coat advantageously has, at least in the area of the threaded portion and/or in the area of the contact portion, a layer thickness which is less than 5.0 microns, preferably less than 1.0 microns, more preferably less than 0.5 microns.

The base coat advantageously has a weight per unit area which is between 5.0 $g/m^2$ and 40.0 $g/m^2$, preferably between 10.0 $g/m^2$ and 30.0 $g/m^2$, more preferably between 22.0 $g/m^2$ and 26.0 $g/m^2$.

The top coat advantageously has a weight per unit area which is between 0.5 g/m² and 15.0 g/m², preferably between 1.0 g/m² and 10.0 g/m², more preferably between 3.0 g/m² and 5.0 g/m².

In a preferred embodiment of the method according to the invention, the base body is coated in the entire area of the base coat with the second composition.

The first composition is preferably an aqueous dispersion and advantageously a suspension. The first composition preferably comprises platelet-shaped particles in the form of lamellae containing zinc, and a binder preferably containing a silane. Advantageously, the first composition further comprises a solvent which is preferably organic, and/or water. Furthermore, the first composition advantageously comprises a thickener.

The second composition is also preferably an aqueous dispersion. The lubricant advantageously contains a hydrofluorocarbon, preferably a perfluorinated hydrocarbon, more preferably polytetrafluoroethylene.

In a preferred embodiment of the method according to the invention, the coating with the first composition comprises at least once, preferably multiple times, in particular twice, application of the first composition to the base body. The base body is expediently subjected to heat treatment after the application of the first composition in order to dry and/or crosslink the applied composition. Depending on the application, the heat treatment can be carried out either in an oven or in the open air.

In a further preferred embodiment of the method according to the invention, the coating with the second composition comprises at least once, preferably multiple times, application of the second composition to the base coat. The base body is expediently also subjected to a heat treatment after the application of the second composition to dry and/or crosslink the applied composition. Depending on the application, this heat treatment can also be carried out either in a furnace or in the open air.

Details and other advantages of the invention result from the following description of preferred embodiments. In the drawings schematically illustrative the embodiments show in detail:

Figure 1A:
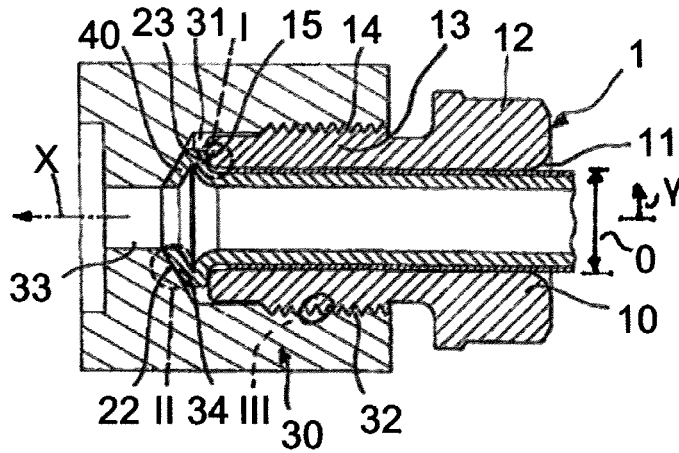
FIG. 1a is a longitudinal section through a pipe connected to a connection element with a flare of form F.

The embodiment shown in FIG. 1a has a pipe 20 provided with a flare 21 of form F according to the standard DIN 74 234:1992-09, which is attached by means of a union screw 1 or pipe screw to a connection element 30, which is, for example, an aggregate of the braking system of a motor vehicle. The flare 21 has a sealing face 22 and an abutment face 23. The connection element 30 has a tapped hole 31, that is, an opening 31 provided with an internal thread 32, which leads into a passage line 33. The tapped or threaded hole 31 has a connection face 34 located at the bottom of the opening, which edges the passage line 33 and in the case of FIG. 1a is concave.

The union screw 1 has a metal base body 10, which extends in an axial direction x and has a through opening 11, which in a radial direction r has a diameter D. Pipe 20 extends through the through opening 11. On the base body 10, a screw head 12 is formed, which serves to transfer a torque to the union screw 1. Furthermore, a threaded portion 13 is formed on the base body 10, which has an external thread 14 and serves to screw the union screw 1 into the internal thread 32 of the tapped hole 31. In addition, a contact portion 15 is formed on the base body 10, which serves to lie on the abutment face 23 of the flare 21 in the screwed-in state of the union screw 1.

Figure 1B:
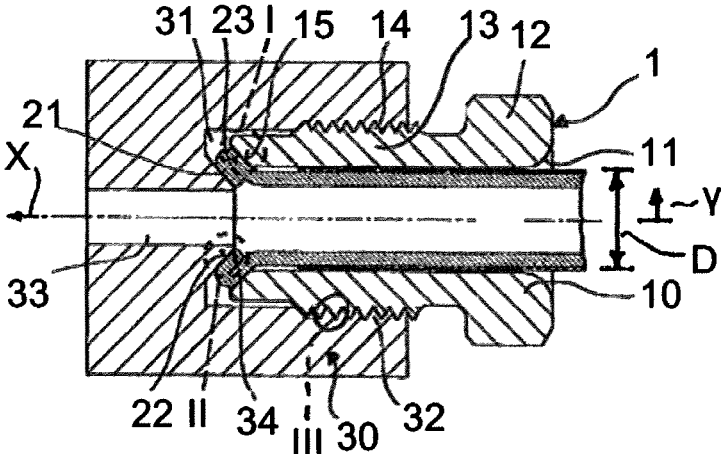
FIG. 1b is a longitudinal section according to FIG. 1a with a flare of the form E.

The embodiment shown in FIG. 1b also has a pipe 20 provided with a flare 21, which is attached to a connection element 30 by means of a union screw 1. In contrast to the embodiment according to FIG. 1a, however, the flare 21 does not correspond to the form F, but to the form E according to the standard DIN 74 234:1992-09. The sealing face 22 is therefore concave and is fluid-tight to the convex connection face 34 of the connection element 30 in this case. Furthermore, it can be seen that the contact portion 15 of the union screw 1 is located on the abutment face 23 of the flare 21. The pipe 20 is thus held as in the embodiment according to FIG. 1a by means of the flare 21 between the contact portion 15 of the union screw 1 and the connection face 34.

In order to ensure that when screwing in the union screw 1 into the tapped or threaded hole 31, no torsion of the pipe 20 occurs, which led to an undesirable torsional stress in the pipe 20, it is desirable that in the contact area I between the contact portion 15 of the union screw 1 and the abutment face 23 of the flare 21, a comparatively low friction occurs. In the contact area II between the sealing face 22 of the flare 21 and the connection face 34 and in the contact area III between the external thread 14 of the union screw 1 and the internal thread 32 of the thread hole 31, on the other hand, it is advantageous, if a comparatively large friction occurs to ensure on the one hand a fluid-tight concern of the pipe 20 on the connection element 30 and on the other hand a firm and permanent fit of the union screw 1 in the threaded hole 31.

In order to meet these different requirements, the surface of the union screw 1 is provided with a functional layer 40, which causes a suitable coefficient of friction p. The coefficient of friction, also called friction coefficient, is a dimensionless number calculated from measured physical properties and depends on the type and geometry of the surfaces in contact. Test setups and test procedures for determining the friction coefficients or friction coefficients describe in particular the VDA standard 235-203 and the standard DIN EN ISO 16047:2005.

Figure 2:
FIG. 2a is a micrograph of a functional layer.

The functional layer 40, with which the base body 10 is coated at least in the area of the threaded portion 13 and the contact portion 15, is multi-layered and is composed of at least one base coat 41 and a top coat 42 applied to the base coat 41 at least partially. The base coat 41 creates a corrosion protection and, as FIG. 2 indicates, forms a structure comprising zinc-containing lamellae 43, which are substantially arranged flat on the base body 10, and a binder. The top coat 42 produces a friction-reducing coating that causes the coefficient of friction p and contains a lubricant comprising a silane.

Zinc is the essential component of lamellae 43. The lamellae 43 contain more than 50 wt.-% zinc. In addition, in the lamellae 43 another metal may be present, which is either in the form of additional lamellae made of this further metal, or is alloyed with the zinc. The other metal is preferably aluminum, tin, magnesium, nickel, cobalt or manganese. In the present embodiment, the base coat 41 comprises a mixture of zinc and aluminum lamellae 43.

The metal components of base coat 41 are connected by a matrix of a binder. The binder contains a silane. In order to enable a good bonding of the metal components, the silane has functional groups. A preferred reactive and functional chemical unit is the epoxy group. A particularly suitable representative of such an epoxysilane is γ-glycidoxypropyltrimethoxysilane.

The base coat 41 has a layer thickness $d_G$ in the region of the threaded portion 13 and/or in the region of the contact portion 15, which is usually between 0.5 μm and 30.0 μm, in the present case between 5.0 μm and 10.0 μm. Base coat 41 has a weight per unit area MG, which is usually between 5.0 g/m² and 40.0 g/m², in this case between 22.0 g/m² and 26.0 g/m².

The relatively thin top coat 42 compared to the base coat 41 has a layer thickness $d_D$ in the region of the threaded portion 13 and/or in the region of the contact portion 15, which is usually less than 5.0 μm, in the present case less than 1.0 μm. The weight per unit area MG of the top coat 41 is usually between 0.5 g/m² and 15.0 g/m², in the present case between 3.0 g/m² and 5.0 g/m².

The method of manufacturing the union screw 1 comprises the following process steps. First, the base body 10 is coated with a first composition containing zinc-containing lamellae and a binder to create the base coat 41. Thereafter, the base body 10 is coated in at least one part of the base coat 41 with a second composition containing a lubricant to produce the top coat 42. The base body 10 can be coated in the entire area of the base coat 41 with the second composition, but a coating is usually sufficient in the areas relevant for friction with the friction partners, i.e. the abutment face 23 and the internal thread 32, in particular in threaded portion 13 and in contact portion 15.

In the preparation of the base coat 41, a suspension of the lamellae 43 is preferably used in a liquid phase. The dispersant is preferably water, wherein in the suspension advantageously a thickener, is present to increase its viscosity.

The lubricant in the top coat 42 is a polymeric fluorocarbon, in particular a perfluorinated hydrocarbon, more preferably polytetrafluoroethylene. In the preparation preferably a lubricant dispersion is used, in particular polytetrafluoroethylene is suspended in a liquid, for example water.

Coating with the first composition is carried out by applying the first composition to the base body 10 at least once, in particular two or three times. Subsequently, the base body 10 is subjected to a heat treatment to dry and/or crosslink the applied composition.

The coating with the second composition is also carried out by at least once, preferably several times, application of the second composition to the base coat 41. Subsequently, the base body 10 is subjected to a heat treatment to dry and/or crosslink the applied composition.

Figure 3A:
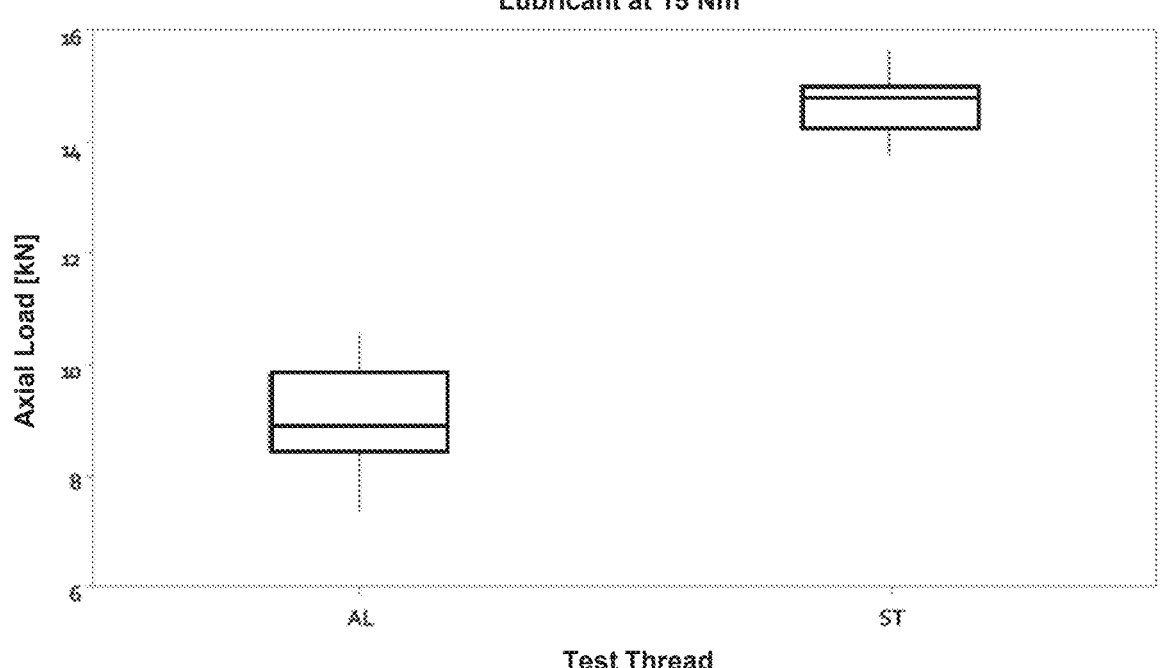
FIG. 3a is a diagram showing a measured axial load for union screws provided with conventional zinc-nickel and lubricant coatings.
Figure 3B:
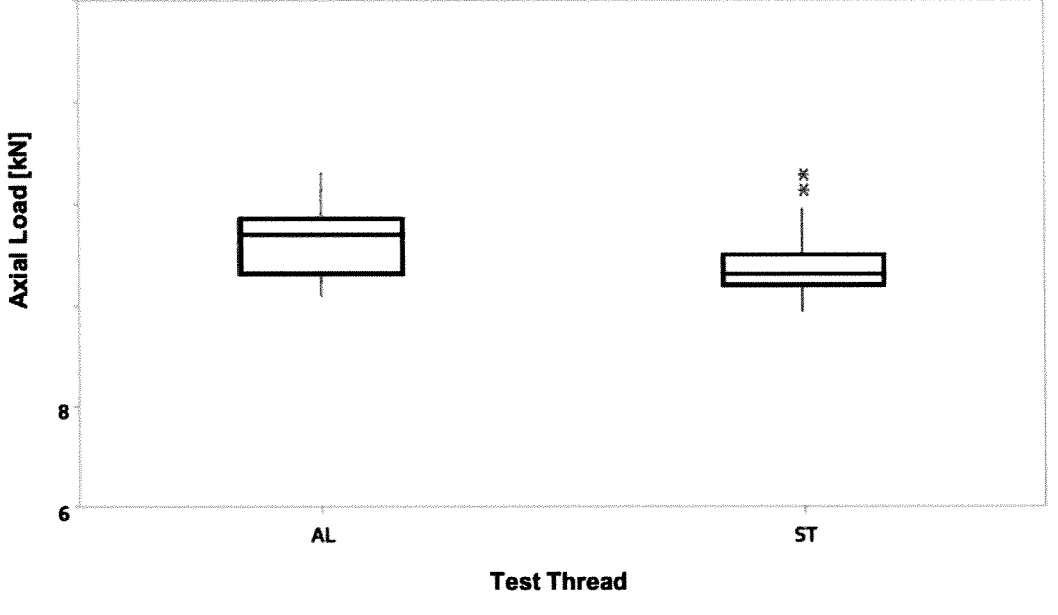
FIG. 3b is a diagram showing a measured axial load for union screws coated according to the invention.
Figure 3C:
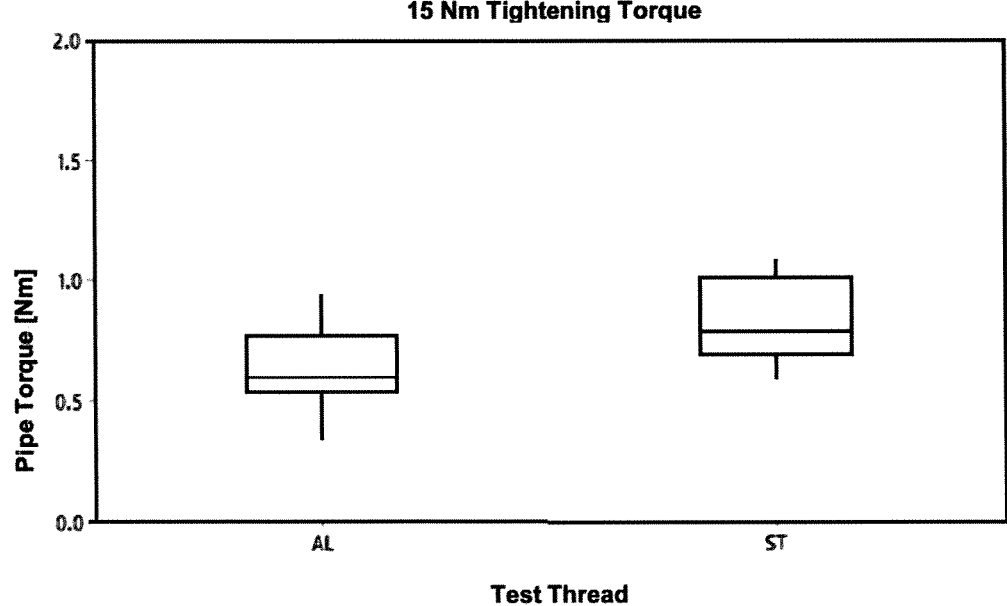
FIG. 3c is a diagram showing a measured pipe torque for union screws coated according to the invention.

FIGS. 3a to 3c show the values resulting from the functional layer 40 for different materials that make up the friction partners for a measured axial load and a measured pipe torque, i.e. the moment acting on a brake pipe, for example. The diagram according to FIG. 3a shows the axial load resulting from conventionally coated union screws. The diagrams according to FIGS. 3b and 3c clearly show that, in contrast to conventional coatings, with the usual materials aluminum (AL) and steel (ST) the values for the axial load and the values for the tube torque in the invention coated union screws in each case in two measurement sequences relatively are close to each other. Thus, the functional layer 40 allows an invariance of the union screw 1 with regard to the friction partners, which takes into account a practical handling.

Figure 4:
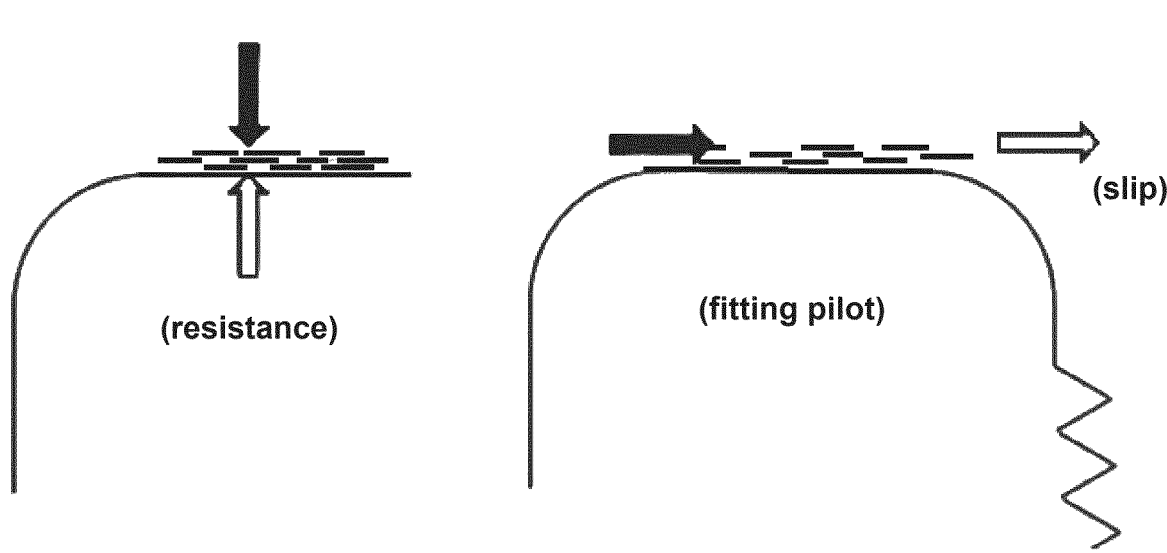
FIG. 4 is a representation showing the "slip" effect inherent in the invention.

The FIG. 4. illustrates that a reduction in pipe torque is a function of the flatness of the zinc lamellae and their parallelism to the base coat. During the tightening of the union screw, the shear stresses in the base coat caused by the turning of the screw connection are not resisted to the same extent as the vertical forces. This allows, as FIG. 4 also shows, a "slipping" between the lamellae or slats in the direction in which the slats lie.

| List of reference signs | |
| --- | --- |
| 1 | union screw |
| 10 | base body |
| 11 | through opening |
| 12 | screw head |
| 13 | threaded portion |
| 14 | external thread |
| 15 | contact portion |
| 20 | pipe |
| 21 | flare |
| 22 | sealing face |
| 23 | abutment face |
| 30 | connection element |
| 31 | tapped hole |
| 32 | internal thread |
| 33 | passage line |
| 34 | connection face |
| 40 | functional layer |
| 41 | base coat |
| 42 | top coat |
| 43 | zinc-containing lamellae |
| x | axial direction |
| r | radial direction |
| $d_G$ | layer thickness of the base coat |
| $d_D$ | layer thickness of the top coat |
| $M_G$ | weight per unit area of the base coat |
| $M_D$ | weight per unit area of the top coat |
| μ | coefficient of friction |
| l | length |
| b | width |
| d | thickness |
| D | Diameter of the through opening |
| I | contact area with comparatively low friction |
| II | contact area with comparatively high friction |
| III | contact area with comparatively high friction |

The invention claimed is:

1. A union screw for brake pipes having at least one flare, comprising:

a metal base body extending in an axial direction and having a through opening having a diameter in a radial direction and adapted to receive the pipe;

a screw head formed on the base body, which is configured to transmit a torque to the union screw;

a threaded portion formed on the base body, the threaded portion having an external thread and being adapted to screw the union screw into a tapped hole;

a contact portion formed on the base body and adapted to abut the flare of the pipe, and a functional layer with which the base body is coated at least in the region of the threaded portion and the contact portion;

wherein the functional layer is multilayered and is composed at least of a base coat and a top coat applied to the base coat at least in regions;

wherein the top coat contains a lubricant to provide a friction-reducing coating, and wherein the base coat comprises a binder and zinc to provide corrosion protection;

wherein the base coat forms a structure in which the zinc is in the form of zinc-containing lamellae;

wherein the zinc-containing lamellae are platelet-shaped and have a length, a width, and a thickness;

wherein the zinc-containing lamellae are oriented to lie substantially flat on the base body;

wherein the length and/or the width and/or the thickness is between 5 μm and 500 μm.

2. The union screw according to claim 1, wherein the length and/or the width and/or the thickness of the zinc-containing lamellae is between 10 μm and 200 μm, or wherein the length and/or the width and/or the thickness of the zinc-containing lamellae is between 50 μm and 150 μm.

3. The union screw according to claim 1, wherein the zinc-containing lamellae contain more than 50% by weight of zinc.

4. The union screw according to claim 3, wherein the zinc-containing lamellae also contain lamellae of another metal selected from the group consisting of aluminum, tin, magnesium, nickel, cobalt or manganese.

5. The union screw according to claim 1, wherein the zinc is alloyed with at least one further metal.

6. The union screw according to claim 5, wherein the further metal is selected from athe group consisting of aluminum, tin, magnesium, nickel, cobalt or manganese.

7. The union screw according to claim 6, wherein the zinc-containing lamellae are made of a zinc-aluminum alloy.

8. The union screw according to claim 1, wherein the binder comprises a silane;

wherein the silane has functional groups; or wherein the silane has an epoxy group; or wherein the silane is γ-glycidoxypropyltrimethoxysilane.

9. The union screw according to claim 1, wherein the lubricant comprises a hydrofluorocarbon, or wherein the lubricant comprises a perfluorinated hydrocarbon, or wherein the lubricant comprises polytetrafluoroethylene.

10. The union screw according to claim 1, wherein the base body is coated with the functional layer in the region of the screw head.

11. The union screw according to claim 10, wherein the entire surface of the base body is coated with the functional layer.

12. The union screw according to claim 1, wherein the top coat is applied to the entire base coat; and/or the base coat forms the lowermost layer of the functional layer; and/or the top coat forms the uppermost layer of the functional layer.

13. The union screw according to claim 1, wherein at least in the region of the threaded portion and/or in the region of the contact portion, the base coat has a layer thickness which is (i) between 0.5 μm and 30.0 μm, or (ii) between 1.0 μm and 20.0 μm, or (iii) between 5.0 μm and 10.0 μm.

14. The union screw according to claim 1, wherein the base coat has a weight per unit area which is (i) between 5.0 g/m2 and 40.0 g/m2, or (ii) preferably-between 10.0 g/m2 and 30.0 g/m2, or (iii) further prefer ably-between 22.0 g/m2 and 26.0 g/m2.

15. The union screw according to claim 1, wherein at least in the region of the threaded portion and/or in the region of the contact portion, the top coat has a layer thickness which is (i) less than 5.0 μm, or (ii) less than 1.0 μm, or (ii) less than 0.5 μm.

16. The union screw according to claim 1, wherein the top coat has a weight per unit area which is between (i) 0.5 g/m² and 15.0 g/m², or (ii) 1.0 g/m² and 10.0 g/m², or (iii) 3.0 g/m² and 5.0 g/m².

17. A method of manufacturing a union screw for brake pipes having at least one flare, a metal base body extending in an axial direction and having a through opening having a diameter in a radial direction and adapted to receive the pipe;

a screw head formed on the base body, which is configured to transmit a torque to the union screw; a threaded portion formed on the base body, the threaded portion having an external thread and being adapted to screw the union screw into a tapped hole; a contact portion formed on the base body and adapted to abut the flare of the pipe, and a functional layer with which the base body is coated at least in the region of the threaded portion and the contact portion; wherein the functional layer is multilayered and is composed at least of a base coat and a top coat applied to the base coat at least in regions; wherein the top coat contains a lubricant to provide a friction-reducing coating, and wherein the base coat comprises a binder and zinc to provide corrosion protection; wherein the base coat forms a structure in which the zinc is in the form of zinc-containing lamellae; and wherein the zinc-containing lamellae are oriented to lie substantially flat on the base body, the method comprising:

a) coating the base body with a first composition comprising zinc-containing lamellae and a binder to form the base coat, wherein the zinc-containing lamellae are oriented to lie substantially flat on the base body, wherein the coating comprises applying the first composition to the base body at least once; wherein the base body is subjected to a heat treatment after the application of the first composition in order to dry and/or crosslink the applied composition; and b) coating the base body in at least a portion of the base coat with a second composition comprising a lubricant to produce the top coat, wherein the coating comprises applying the second composition to the base coat at least once.

18. The method of claim 17, wherein the base body is coated with the second composition in the entire area of the base coat.

19. The method of 17, wherein the first composition is an aqueous dispersion; or wherein the first composition is a suspension; or wherein the first composition comprises:

platelet-shaped particles in the form of lamellae containing zinc, and a binder which contains a silane; and/or wherein the first composition further comprises:

a solvent, which is organic, and/or water; and/or wherein the first composition further comprises:

a thickening agent.

20. The method of claim 17, wherein the second composition is an aqueous dispersion.

21. The method of claim 20, wherein the lubricant comprises a hydrofluoro-carbon, preferably a perfluorinated hydrocarbon, more preferably polytetrafluoro-ethylene.

22. The method of claim 17, wherein the coating according to method step a) comprises applying the first composition to the base body several times.

23. The method of claim 17, wherein the coating according to method step b) comprises applying the second composition to the base coat several times.

24. The method of claim 17, wherein the base body is subjected to a heat treatment after the application of the second composition in order to dry and/or crosslink the applied composition.

\* \* \* \* \*